United States Patent
Liang et al.

(10) Patent No.: US 9,262,677 B2
(45) Date of Patent: Feb. 16, 2016

(54) VALUABLE FILE IDENTIFICATION METHOD AND IDENTIFICATION SYSTEM, DEVICE THEREOF

(75) Inventors: Tiancai Liang, Guangzhou (CN); Zongbin Mu, Guangdong (CN); Dahai Xiao, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 66 days.

(21) Appl. No.: 13/810,422

(22) PCT Filed: Jun. 29, 2011

(86) PCT No.: PCT/CN2011/076550
§ 371 (c)(1),
(2), (4) Date: Jan. 15, 2013

(87) PCT Pub. No.: WO2012/016484
PCT Pub. Date: Feb. 9, 2012

(65) Prior Publication Data
US 2013/0121539 A1    May 16, 2013

(30) Foreign Application Priority Data
Aug. 3, 2010  (CN) .......................... 2010 1 0251473

(51) Int. Cl.
*G06K 9/00*    (2006.01)
*G07D 7/20*    (2006.01)
(Continued)

(52) U.S. Cl.
CPC ........ *G06K 9/00442* (2013.01); *G06K 9/00483* (2013.01); *G06K 9/2018* (2013.01);
(Continued)

(58) Field of Classification Search
CPC . G07D 7/2058; G07D 7/2025; G07D 7/2008; G06K 9/00442; G06K 9/6272; G06K 9/00483; G06K 9/40; G06K 9/3233; G06K 9/4604; G06K 9/2018

USPC ......... 382/112, 135, 254, 275, 149, 118, 165; 705/35
See application file for complete search history.

(56) References Cited

U.S. PATENT DOCUMENTS 5,285,196 A *  2/1994  Gale, Jr. ........................ 345/108
6,324,298 B1 * 11/2001  O'Dell et al. ................. 382/149
(Continued)

FOREIGN PATENT DOCUMENTS

CN         1139437 C     2/2004
CN       101517619 A     8/2009
(Continued)

OTHER PUBLICATIONS
International Search Report dated from corresponding International Application No. PCT/CN2011/076550.
(Continued)

*Primary Examiner* — Utpal Shah
*Assistant Examiner* — Pinalben Patel
(74) *Attorney, Agent, or Firm* — Wolf, Greenfield & Sacks, P.C.

(57) ABSTRACT

A valuable file identification method includes step 1: selecting a characteristic area of the valuable file, and extracting a valuable file characteristic for last classification; step 2: an input valuable file is fast classified according to the extracted valuable file characteristic in step 1 to gain the banknote kind, denomination, direction and image quality information of the valuable file, and the banknote with better image quality and bad image quality are selected; step 3: an image restoration technique is utilized based on a partial differential equation to restore the old banknote image; step 4: the new banknote is directly identified and the old banknote is identified via the restored image to judge the authenticity of the current banknote; step 5: a result is output. The method enables eliminating restoration treatment for images comprising good quality and uninterested area, and saving time and improving system processing efficiency. A valuable file identification system and a valuable file identification device are also disclosed.

11 Claims, 3 Drawing Sheets

(51) Int. Cl.
*G06K 9/62* (2006.01)
*G06K 9/20* (2006.01)
*G06K 9/32* (2006.01)
*G06K 9/40* (2006.01)
*G06K 9/46* (2006.01)

(52) U.S. Cl.
CPC ............... *G06K9/3233* (2013.01); *G06K 9/40* (2013.01); *G06K 9/4604* (2013.01); *G06K 9/6272* (2013.01); *G07D 7/2008* (2013.01); *G07D 7/2025* (2013.01); *G07D 7/2058* (2013.01)

(56) References Cited

U.S. PATENT DOCUMENTS

| | | | | |
|---|---|---|---|---|
| 6,556,689 | B1* | 4/2003 | Xia et al. | 382/100 |
| 7,256,874 | B2* | 8/2007 | Csulits et al. | 356/71 |
| 7,269,279 | B2* | 9/2007 | Chiles | 382/135 |
| 7,529,422 | B2* | 5/2009 | Wang et al. | 382/254 |
| 2003/0059098 | A1* | 3/2003 | Jones et al. | 382/135 |
| 2006/0210188 | A1* | 9/2006 | Poon et al. | 382/254 |
| 2007/0154079 | A1* | 7/2007 | He et al. | 382/135 |
| 2007/0196013 | A1* | 8/2007 | Li et al. | 382/159 |
| 2009/0152357 | A1* | 6/2009 | Lei et al. | 235/454 |

FOREIGN PATENT DOCUMENTS

| | | |
|---|---|---|
| CN | 201383174 Y * | 1/2010 |
| CN | 101908241 A | 12/2010 |
| DE | 102008041944 A1 | 3/2010 |
| WO | WO 2008/014090 A2 | 1/2008 |
| WO | WO 2009096535 A | 8/2009 |
| WO | WO 2010/004101 A1 | 1/2010 |

OTHER PUBLICATIONS

Extended European Search Report dated Mar. 24, 2014 from corresponding International Application PCT/CN2011/076550.

* cited by examiner

VALUABLE FILE IDENTIFICATION METHOD AND IDENTIFICATION SYSTEM, DEVICE THEREOF

This application is a U.S. National Stage application of PCT international application PCT/CN2011/076550, filed on Jun. 29, 2011 which claims the priority of Chinese Patent Application No. 201010251473.0, titled "Method for Identifying Valuable Document and Valuable Document Identifying System", filed with the Chinese State Intellectual Property Office on Aug. 3, 2010, the entire disclosure of which are incorporated herein by reference.

FIELD OF THE INVENTION

The present invention relates to an image processing and mode identifying technique, especially to a method for identifying valuable document, such as paper money, a valuable document identifying system, and a valuable document identifying device.

BACKGROUND OF THE INVENTION

With the rapid economic growth, circulation amount of the paper money become larger and larger, and therefore the traditional way of manual handling in the bank could hardly meet the requirements of handling large amount of paper money. To improve the efficiency of paper money handling and reduce labor costs, there is an urgent need to put a large amount of usable and reliable financial self-service equipments into market. However, a high proportion of the paper money in circulation are old paper money, and the image of most old paper money are degraded by handwriting, scratches, stain, folds, which make paper money identification more difficult. Since the present, the financial self-service equipments produced by the domestic and foreign manufacturers have poor adaptability for the damaged paper money and the old paper money, the financial self-service equipments put into the market present high paper money refusal rate and poor usability, and therefore impairing the popularization of the financial self-service equipments. If the image quality of the old paper money could be restored to that of the new paper money, it is possible to solve the problem that the financial self-service equipments have the high paper money refusal rate for the old paper money. At present, the image restoration technique based on the partial differential equation has get some progress, and can get well restoring performance when it is used to handle the degradation like scratches, handwriting, stain and folds. The studying contents of the image restoration based on the partial differential equation and image restoration of the old paper money are consistent. Therefore, it is possible to achieve well restoration performance by applying image restoration technique based on the partial differential equation to the image restoration of the bank note.

FIG. 1 is a flow chart showing the traditional bank note image identification processing. As shown, at first, the whole image is processed for image restoration to extract its features, then the bank note is classified according to the standards such as bank note type, denomination and new or old degree, and finally the bank note is identified.

T is designated as the identifying time for each bank note, $t_a$ is designated as the time for image processing, $t_b$ is designated as the time for feature extracting, $t_c$ is designated as the time for classifying, $t_d$ is designated as the time for identifying, $T_{max}$ is designated as the time range for the real-time response of the system. When and only when the identifying system satisfies equation (1), the requirements for the practical application could be reached:

$$T = t_a + t_b + t_c + t_d$$

$$T \leq T_{max} \quad (1)$$

For the old bank note which is degraded by handwriting, scratches, stain, folds, the degradation of the bank note will reduce the identification accuracy of the system. Under such circumstance, the system is firstly required to process the "whole image" of the bank note for image restoration, which will cost a lot of time, such that the image processing time $t_a$ become far greater than the classifying time $t_c$, i.e. $t_a \gg t_c$.

However, when applying bank note identifying system to financial self-service equipments, high real-time performance is required in which identification for each bank note has to be finished in limited time period. In the bank note identifying system of prior art, the "whole image" of the bank note is firstly processed for image restoration in identification procedure, which cost a large amount of time; furthermore, the bank note having good image quality is also processed for image restoration in prior art, which wastes the system resources. The identifying time for each bank note is increased sharply, such that the bank note identifying system could hardly meet the requirements of real-time $T_{max}$, as specifically shown in equation (2):

$$\left. \begin{array}{l} T\uparrow = t_a\uparrow + t_b + t_c + t_d \\ t_a > T_{max} - (t_b + t_c + t_d) \end{array} \right\} \Rightarrow T > T_{max} \quad (2)$$

Therefore, existing bank note identifying system refuse to process the old bank note, i.e. refuse to identify the old bank note, in order to improve the real-time responding speed, such that a large amount of old bank notes are rejected and the bank note refusal rate of the bank note identifying system is high, which affect the usability of the bank note identifying system as well as the popularity of the financial self-service equipments adversely.

SUMMARY OF THE INVENTION

The object of the present invention is to provide a method for identifying valuable document with high real-time responding speed, and a valuable document identifying system and a valuable document identifying device with high real-time responding speed and low bank note refusal rate.

The method for identifying the valuable document includes steps of:

Step 1: feature extraction: selecting a featured region of the valuable document and extracting features of the valuable document for fast classification from the featured region;

Step 2: fast classification: processing, based on the features of the valuable document extracted in step 1, the input valuable document for fast classification according to the preset classification model to obtain information such as bank note type, denomination, orientation as well as image quality of the valuable document, and pick out a bank note of good image quality—new bank note as well as a bank note of bad image quality—old bank note;

Step 3: image restoration: processing an image of old bank note for restoration by applying an image restoration technique based on partial differential equation, to obtain a restored image;

Step 4: identification processing: identifying the new bank note directly, and identifying the old bank note by identifying its restored image, to determine the authenticity of the present bank note;

Step 5: outputting the determination result of the present bank note.

Furthermore, the feature extraction in step 1 comprises selecting the featured region of multi-wavelength image of bank note based on a multi-wavelength image characteristic of the bank note, a multi-resolution characteristic of the bank note image and an anti-counterfeit characteristic of the bank note image, and extracting the feature from the selected featured region according to classification model.

Furthermore, the features of the valuable document in Step 1 include at least one of a white watermark, a black watermark, a variable ink, a magnetic security thread, a microprinted word gravure printing pattern, a denomination number and a bank note coding number.

Furthermore, the vectorization of the features of the valuable document in Step 1 specifically includes follow steps of: normalizing the featured region image of the valuable document, so as to obtain normalized image; selecting n different featured regions from the normalized image and calculating the average grey-scale values of the images of the $1^{st}$ to $n^{th}$ featured regions; forming a featured vector according to the $1^{st}$ to $n^{th}$ average grey-scale values. The procedure is specifically described as follows:

Assuming that the bank note with a height H and a width W has a grey-scale image f(x,y), wherein x represents row number (x∈(1,H)), y represents column number (y∈(1,W)), then f (x,y) represents the grey-scale value of the pixel which is located at the coordinates of (x,y). Firstly, the featured region image is normalized, so as to obtain a normalized image J(x,y); then n different featured regions is selected from bank note image. For featured region image $J_i(x,y)$ with a height $M_i$ and a width $N_i$, wherein i=1, 2, . . . , n, the average grey-scale value is chosen as the featured value, i.e.:

$$d_i = \frac{\sum_{x=1}^{M} \sum_{y=1}^{N} J_i(x, y)}{M \times N}$$

Finally, $d_i$ is calculated according to the above equation, so as to obtain a featured vector D={$d_1$, $d_2$, . . . , $d_n$}.

Furthermore, the fast classification model is built up based on different bank note types, denominations, orientations and image qualitys.

Furthermore, the fast classification model includes following levels:

The first level: different bank note type, such as CNY, EUR, USD;

The second level: different denomination for the same bank note type;

The third level: different orientation for the same denomination;

The forth level: different image quality for the same denomination, including new bank note and old bank note.

Alternatively, the levels of the classification model could be arranged as follows:

The first level: different bank note type, such as RMB, EUR, USD;

The second level: different denomination for the same bank note type;

The third level: different image quality for the same denomination, including new bank note and old bank note;

The forth level: different orientation for the same denomination.

Furthermore, the classification model is built up by the following steps: setting the featured regions based on p bank note types, q denominations for each bank note type, front and back sides for each denomination as well as image of new bank note and image of old bank note; normalizing formed p×q×4 different images to obtain normalized images; selecting n different featured regions from each of the normalized images, and calculating the average grey-scale values for the images of the $1^{st}$ to $n^{th}$ featured regions respectively, to form featured vectors; training the featured vectors with R training samples to produce p×q×4 clustering centers, and thus building up the classification model for the featured region of the valuable document.

Specifically, $\Omega=\{\Psi_1, \Psi_2, \ldots, \Psi_p\}$ is designated as all of the bank note type; wherein $\Psi_i=\{\overline{\omega}_1, \overline{\omega}_2, \ldots, \overline{\omega}_q\}$ means $i^{th}$ bank note type includes q types of denominations;

$A=\{\alpha_1, \alpha_2\}$ is designated as the orientation of the bank note, wherein $\alpha_1$ means front side and $\alpha_2$ means back side;

$B=\{\beta_1, \beta_2\}$ is designated as the image quality, wherein $\beta_1$ means new and $\beta_2$ means old;

Thus, p×q×4 number of categories are obtained, and each category is represented by $C_k$(k=1, 2, . . . , p×q×4), as described in the following equation:

$$C_1\{\Psi_1 \cup \overline{\omega}_1 \cup \alpha_1 \cup \beta_1\}, \ldots, C_{p \times q \times 4}=\{\Psi_p \cup \overline{\omega}_q \cup \alpha_2 \beta_2\}$$

$D_k$ is designated as the featured vector of category $C_k$, thus:

$$D=\{D_1, D_2, \ldots, D_{p \times q \times 4}\}$$

As for each above-mentioned category $C_k$(i=1, 2, . . . , p×q×4), R number of training samples are selected, and the clustering center of category $C_k$ could be described with the following equation:

$$D_k=\{\overline{d}_{k1}, \overline{d}_{k2}, \ldots, \overline{d}_{kn}\}$$

Wherein $$\overline{d}_{kj} = \frac{\sum_{j=1}^{R} d_{kj}}{R}.$$

Furthermore, fast classification includes following steps:

As for each extracted feature, the distance between the clustering center $D_k$ of each category and the extracted feature is:

$$\epsilon_k=\|D-D_k\|(k=1,2,\ldots,p \times q \times 4)$$

Classification Determining Function is defined as:

$$\begin{cases} g_j(D) = \min_k(\epsilon_k) \\ \quad = \min_k \|D - D_k\|(k = 1, 2, \ldots, p \times q \times 4) \\ g_j(D) < r \end{cases}$$

Wherein when r∈[0.1−0.5], input D could be classified into category $C_j$; otherwise, input D does not belong to category $C_j$.

Furthermore, the restoring object of the image restoration in step 3 is the interested region (ROI) of the old bank note which is of bad image quality.

Furthermore, the image restoration of the old bank note is completed with the image restoration method based on the partial differential equation.

A system for identifying a valuable document provided in the present invention includes:

an image collecting module configured to collect image data of the valuable document;

a memory module configured to store the image data and necessary standard model data;

a data processing module configured to process the above-mentioned stored image data for feature extraction from featured region, fast classification and image restoration; that is, selecting the featured region of the valuable document, and extracting the feature of the valuable document from the featured region; according to the extracted the feature of the valuable document, processing the input valuable document for fast classification based on preset classification model, and thus picking out the bank note of good image quality and bank note of bad image quality; processing the bank note of bad image quality for restoration, to obtain restored image (i.e., image data);

an identifying module configured to compare the processed image data with the standard model data to perform a identification process;

an output module configured to output the identified result of the identifying module; and a central control module configured to control and harmonize the operations of the above-mentioned modules (i.e. the image collecting module, the memory module, the data processing module, the identifying module and the output module), including data transmission, resource allocation, etc.

The modules in the present valuable document identifying system are connected by a data link. Since the data link is well known in the prior art, its description will be omitted in the present invention.

The present invention provides a device for identifying a valuable document, which includes:

a selecting module configured to select a featured region of the valuable document;

an extracting module configured to extract feature of the valuable document from the featured region;

a classification processing module configured to process the input valuable document for fast classification according to a preset classification model based on the extracted the feature of the valuable document, and pick out a bank note of good image quality and a bank note of bad image quality;

a restoration processing module configured to process an image of the bank note of bad image quality for restoration, to obtain a restored image;

an identifying module configured to identify the bank note of good image quality obtained by the classification processing module directly; and identify the restored image obtained by the restoration processing module, to determine the authenticity of the present bank note; and an output module configured to output the determined result of the present bank note obtained by the identifying module.

The method, device and system for identifying the valuable document have the advantageous effects. The procedure of restoring the image of the new bank note which is of good image quality is avoided, therefore the time is reduced and the processing efficiency of the whole system is improved; while since the interested region of the old bank note which is of bad image quality (ROI) is processed for restoration, the system resources are saved and image data of good quality are provided for the identification section, thus the identification difficulty is lowered while identification accuracy is improved, therefore the acceptance rate of the bank note identifying system is improved.

DETAILED DESCRIPTION

In order to help those skilled in the art to better understand the technical solution of the embodiments of the present invention, the embodiments of the present invention will be further described in detail with reference to the drawings and the embodiments as follows.

Hereinafter, process steps of the method for identifying the valuable document and module frame of the valuable document identifying system according to the present invention will be illustrated and described with reference to the drawings.

Figure 1:
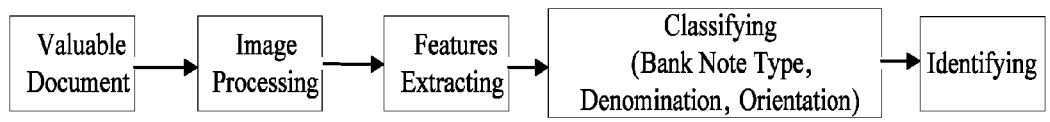
FIG. 1 is a flow chart of the traditional processing method for identifying the bank note image.
Figure 2:
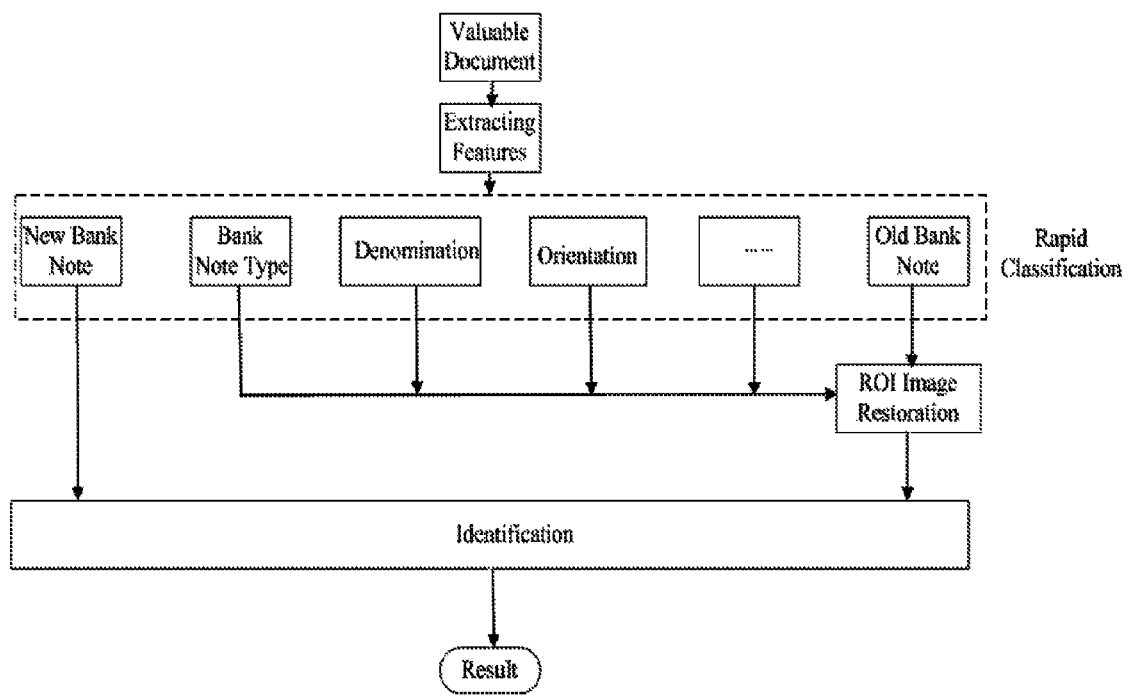
FIG. 2 is a flow chart of a method for identifying the valuable document according to an embodiment of the present invention.

As shown in FIG. 2, the method for identifying the valuable document includes: step 1: extracting features; step 2: fast classification; step 3: image restoration; step 4: identification; and step 5: outputting the result. Hereinafter, specific content of each step will be described in detail:

Step 1, extracting features.

Based on the multi-wavelength image characteristic of the bank note, multi-resolution characteristic of the bank note image and anti-counterfeit characteristic of the bank note image, featured region of multi-wavelength image of the bank note is selected, and features are extracted from the selected featured region according to classification model. These extracted features include: white watermark, black watermark, variable ink, magnetic security thread, micro-printed words, gravure printing pattern, denomination number and/or bank note coding number and so on.

The quantization expressions of the features are described as follows:

Assuming that bank note having a height H and a width W has a grey-scale image $f(x,y)$, wherein x represents row number ($x \in (1,H)$), y represents column number ($y \in (1,W)$), then $f(x,y)$ represents the grey-scale value of the pixel which is located at the coordinates of $(x,y)$.

Firstly, the featured region image is processed for normalization, so as to obtain normalized image $J(x,y)$;

Then, n different featured regions are selected from bank note image, and for featured region image $J_i(x,y)$ having a height $M_i$ and a width $N_i$, wherein $i=(1, 2, \ldots, n)$, the average grey-scale value of the featured region image $J_i(x,y)$ is chosen as featured value of the bank note image, i.e.:

$$d_i = \frac{\sum_{x=1}^{M} \sum_{y=1}^{N} J_i(x, y)}{M \times N}$$

Finally, $d_i$ is calculated according to the above equation, so as to obtain a featured vector $D=\{d_1, d_2, \ldots, d_n\}$.

Step 2, fast classification.

The input information of the bank note is processed for fast classification according to the preset classification model, so as to obtain the type, denomination, orientation and image quality of the bank note, wherein the type, denomination, orientation and image quality of the bank note provide a guiding principle for locating interested region (ROI) in subsequent section. For example, for a RMB bank note of 100 yuan, there are white watermark, denomination number printed with light variable ink and portrait of chairman Mao on the front side thereof, while there are underground word, colorful fluorescent red stripes and gravure printed denomination number on the back side thereof.

Whether it is necessary to process image restoration is determined by the image quality. The bank note having good image quality is transmitted to identification procedure directly, while the old bank note having bad image quality is transmitted to data processing module for processing.

Figure 3:
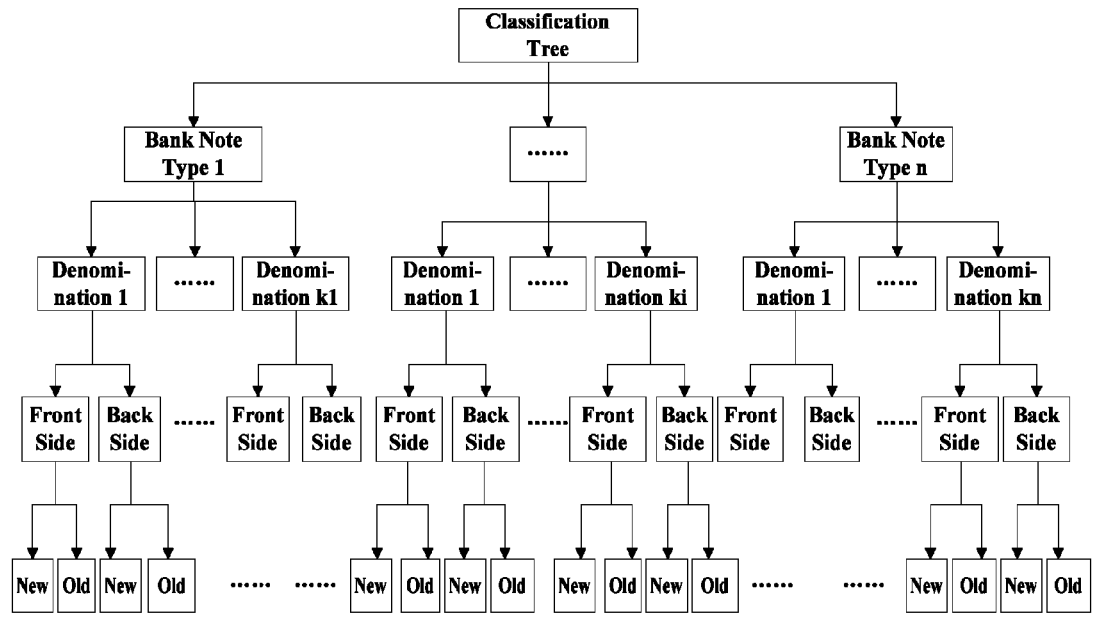
FIG. 3 is a schematic view showing the building-up of the fast classification model in FIG. 2.

The schematic view showing the building-up of the classification module is shown in FIG. 3.

Figure 4:
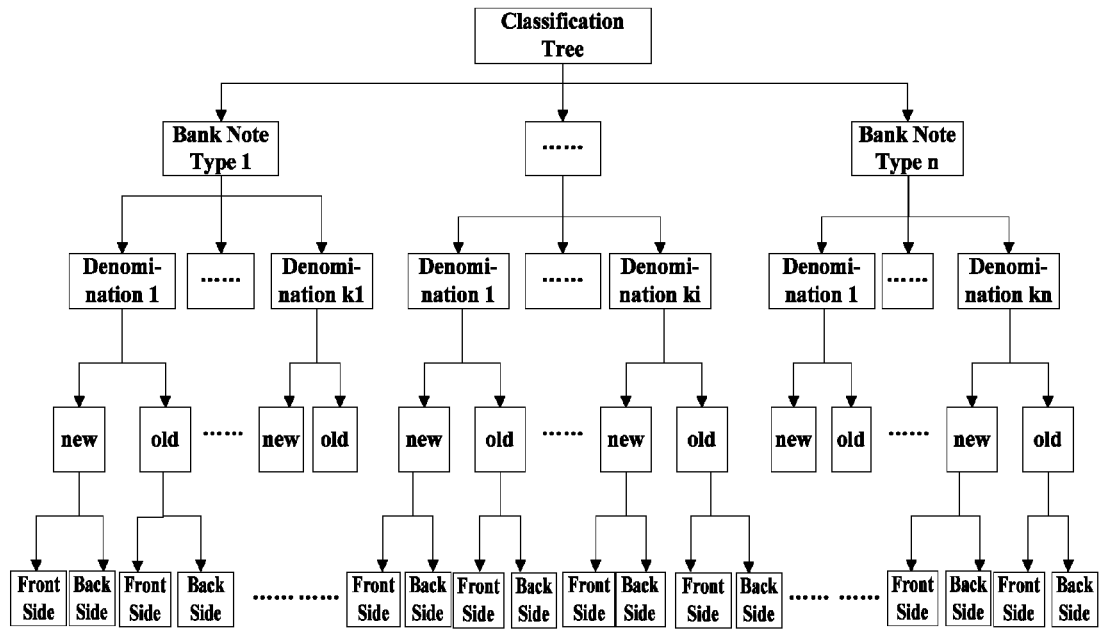
FIG. 4 is another schematic view showing the building-up of the fast classification in FIG. 2.

Firstly, the classification model is built up as the following levels according to different type, denomination and image quality of the bank note:

The first level: processing bank note classification according to different bank note type, such as CNY, EUR, USD;

The second level: processing further bank note classification according to different denomination of the same bank note type, such as RMB bank note of 100 yuan or 50 yuan;

The third level: processing the third-level bank note classification according to different orientation of the same denomination, such as front side or back side;

The forth level: processing further bank note classification according to different image quality of the same denomination, such as new bank note or old bank note.

Wherein the sequence of the third level and the forth level could be exchanged, as shown in FIG. 4. The first level: processing bank note classification according to different bank note type, such as CNY, EUR, USD; the second level: processing the second-level bank note classification according to different denomination of the same bank note type, such as RMB bank note of 100 yuan or 50 yuan; the third level: processing bank note classification again according to different image quality of the same denomination, such as new bank note or old bank note; the forth level: processing further bank note classification according to different orientation of the same denomination, such as front side or back side.

Secondly, clustering center is built up.

$\Omega=\{\Psi_1, \Psi_2, \ldots, \Psi_p\}$ is designated to represent all of the bank note type; wherein $\Psi_i=\{\overline{\omega}_1, \overline{\omega}_2, \ldots, \overline{\omega}_q\}$ means $i^{th}$ bank note type includes q types of denominations;

$A=\{\alpha_1, \alpha_2\}$ is designated to represent the orientation of the bank note, wherein $\alpha_1$ means front side and $\alpha_2$ means back side;

$B=\{\beta_1, \beta_2\}$ is designated to represent the image quality, wherein $\beta_1$ means new and $\beta_2$ means old;

Thus, p×q×4 number of categories are obtained, and each category is represented by $C_k$(k=1, 2, . . . , p×q×4), as described in the following equation:

$$C_1=\{\Psi_1 \cup \overline{\omega}_1 \cup \alpha_1 \cup \beta_1\}, \ldots, C_{p \times q \times 4}=\{\Psi_p \cup \overline{\omega}_q \cup \alpha_2 \cup \beta_2\}$$

$D_k$ is designated as the featured vector of category $C_k$, thus:

$$D=\{D_1, D_2, \ldots, D_{p \times q \times 4}\}$$

As for each above-mentioned category $C_k$(i=1, 2, . . . , p×q×4), R number of training samples are selected, and the clustering center of category $C_k$ could be described with the following equation:

$$D_k=\{\overline{d}_{k1}, \overline{d}_{k2}, \ldots, \overline{d}_{kn}\}$$

Wherein $$\overline{d}_{kj} = \frac{\sum_{j=1}^{R} d_{kj}}{R}.$$

Classification is processed according to the above-mentioned classification model:

As for each extracted feature D, the distance between the clustering center $D_k$ of each category and the extracted feature D is:

$$\epsilon_k=\|D-D_k\|(k=1,2,\ldots,p \times q \times 4)$$

Classification Determining Function is defined as:

$$\begin{cases} g_j(D) = \min_k(\epsilon_k) \\ \quad = \min_k \|D - D_k\|(k = 1, 2, \ldots, p \times q \times 4) \\ g_j(D) < r \end{cases} \quad (3)$$

Wherein, when r∈[0.1-0.5], input D could be classified into category $C_j$; otherwise, input D does not belong to category $C_j$.

Step 3, image restoration.

Figure 5:
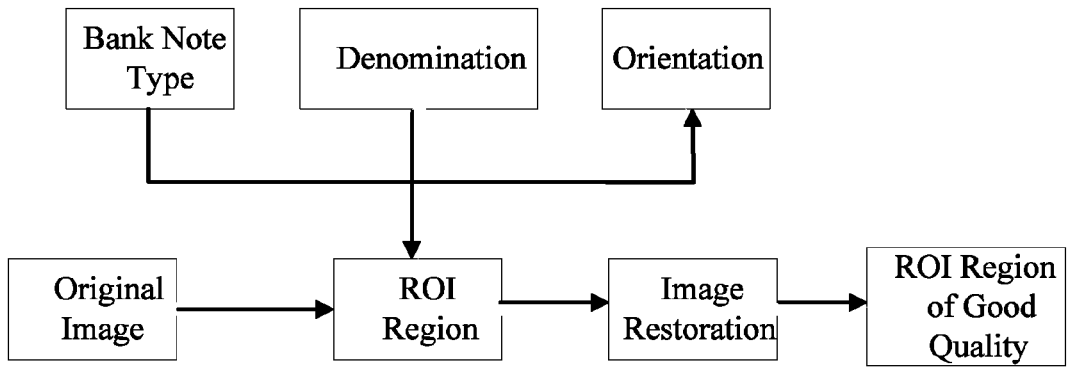
FIG. 5 is a schematic view showing the image restoration in FIG. 2.

The locating interested region (ROI) of the old bank note is processed for image restoration. In other words, the locating interested region (ROI) of the image is firstly determined according to the information obtained in the fast classification section, then the image restoration technique based on the partial differential equation is applied to the image in the locating interested region (ROI) to process the image in locating interested region (ROI) for restoration. The specific processes are shown in FIG. 5. After being processed for restoration, the image in locating interested region (ROI) could meet the requirements of image quality for identification.

The object of the image restoration is to restore the original image from a degraded image (noised, blurred or stained) and reserve the edge and detailed information of the image well while removing the noises and blurs. In order to meet the above-mentioned conditions, the restoring model should satisfy the following requirements: (a) there is isotropic diffusion effect in the regions with small gradient; (b) the diffusion effect develops only along gradient direction in the regions with great gradient. In view of this, the image restoring model based on the partial differential equation employed in the present embodiment is described in the follow equation:

$$\begin{cases} \min_{\Omega} \|f - f_0\|^2 + \lambda \int |\nabla f|^{\Phi} d\Omega \\ \Phi = \Phi(|\varphi(f_0)|) \end{cases} \quad (4)$$

Wherein f is the observed image obtained in real-time, while $f_0$ is the original image; by taking use of gradient descending method and by introducing a time variant t, image f could be regarded as a function varied with time. Assuming that the degraded image is a time function at the initial time, i.e. $f(x,t=0)=f$, then $f_t=f(x,t)$.

$\Omega \in R^n$ is a bounded open set; $\lambda$ is variable parameter, while $\nabla$ is gradient operator;

$\Phi(\bullet)$ is a monotonic decreasing function; $\varphi(\bullet)$ is a non-local averaging filter.

(1) $\Phi(\bullet)$ employs the boundary function in PM Anisotropic diffusion model, as indicated in the following equation.

$$\Phi(s) = 1 + \frac{1}{1 + \left(\frac{s}{M}\right)^2} \quad (5)$$

Wherein M is boundary threshold parameter.

(2) Non-local averaging filter $\varphi(\bullet)$ is described in the following equation:

$$\varphi(u)(x) = \frac{1}{C(x)} \int e^{\frac{(G_{\alpha*}|u(x+\cdot)-u(y+\cdot)|^2)(o)}{h^2}} u(y) dy \quad (6)$$

The gradient descending equation of the equation (4) is:

$$f_t = f - f_0 + \lambda div \left( \Phi(\phi(f_0)) |\nabla f|^{\Phi(\phi(f_0))-1} \frac{\nabla f}{|\nabla f|} \right) \quad (7)$$

Wherein div($\bullet$) represents a divergence.

In order to avoid denominator to be zero, an infinitesimal is added to the denominator, thus the above equation is changed into the following one:

$$f_t = f - f_0 + \lambda div \left( \Phi(\phi(f_0)) |\nabla f|^{\Phi(\phi(f_0))-1} \frac{\nabla f}{\sqrt{|\nabla f|^2 - \xi^2}} \right) \quad (8)$$

Taking the image of locating interested region (ROI) observed in real-time as f; taking standard ROI image as $f_0$, and using gauss-seidel method to iterate equation (8), then the restoring process of ROI image f is finished.

Step 4, identification.

The bank note information entering this section includes two kinds: bank note of bad quality which is processed for image restoration, i.e., old bank note; and the bank note of good quality which is not processed for image restoration, i.e., new bank note.

By matching the bank note information with the pre-stored bank note standard model, the authenticity of the present bank note may be determined.

Step 5, outputting result.

The authenticity result of the bank note is output.

In the above-mentioned method for identifying valuable document in which the bank note is taken as an example, since the valuable document is classified at the first stage, and then only the old bank notes of bad image quality are processed for restoration according to classified result, a large amount of processing time for image restoration is saved and real-time responding speed of the bank note identifying system is improved.

Figure 6:
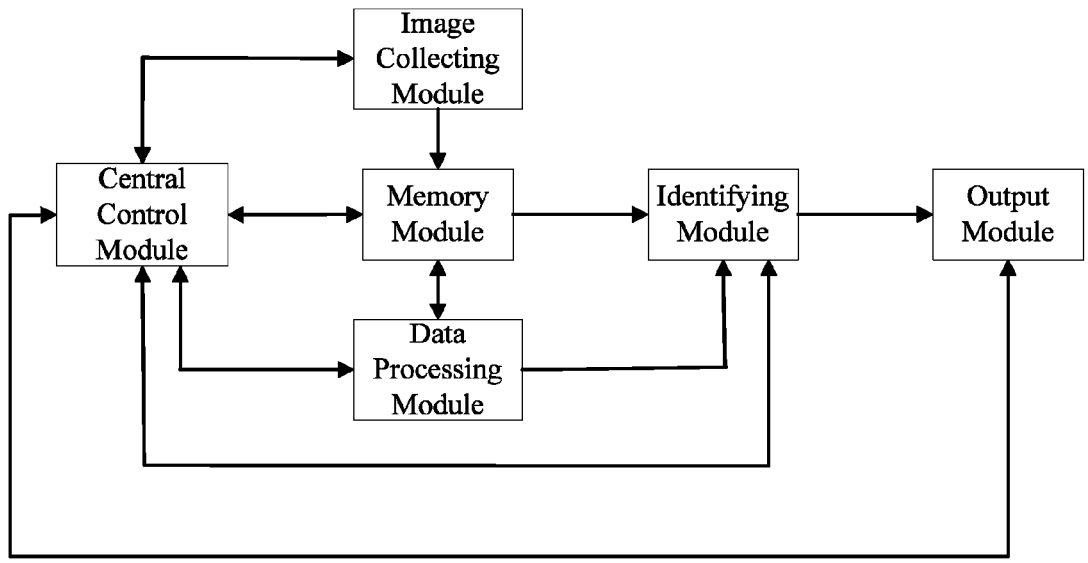
FIG. 6 is a structural schematic view of the valuable document identifying system according to an embodiment of the present invention.

The module structure of the system for realizing the method for identifying valuable document is shown in FIG. 6, including:

an image collecting module, which is used to collect image data of the valuable document;

a memory module, which is used to store the above-mentioned image data and necessary standard model data;

a data processing module, which is used to process the above-mentioned stored image data for feature extraction from featured region, fast classification and image restoration; that is, selecting the featured region of the valuable document, and extracting the feature of the valuable document from the featured region; according to the extracted the feature of the valuable document, processing the input valuable document for fast classification based on preset classification model, and thus picking out the bank note of good image quality and bank note of bad image quality; processing the bank note of bad image quality for restoration, so as to obtain restored image;

an identifying module, which is used to process the above-mentioned processed image data for identification;

an output module, which is used to output the identified result of the identifying module; and a central control module, which is used to control and harmonize the operations of the above-mentioned modules, including data transmission, resource allocation, etc.

Various modules are connected by a data link. Since the data link is well known in the prior art, its description will be omitted in the present invention.

Since the implementing of function and action of the modules in the system is fully described in corresponding implementing of the above-mentioned method, its description is omitted herein.

Based on the implementing of the above-mentioned method, the present invention also provides a valuable document identifying device, which includes: a selecting module, an extracting module, a classification processing module, a restoration processing module, an identifying module and an output module. The selecting module is used to select featured region of the valuable document; the extracting module is used to extract the feature of the valuable document from the featured region; the classification processing module is used to process the input valuable document for fast classification based on preset classification model according to the extracted feature of the valuable document, and thus picking out the bank note of good image quality and bank note of bad image quality; the restoration processing module is used to process the image of the bank note of bad image quality for restoration, so as to obtain restored image; the identifying module is used to directly identify the bank note of good image quality obtained by classification processing module and identify the restored image obtained by the restoration processing module, so as to determine the authenticity of the present bank note; and the output module is used to output the determined result of the present bank note obtained by the identifying module.

The valuable document identifying device could be either integrated in service terminal or arranged individually, which is not limited in the present embodiment.

Since the implementing of function and action of the modules in the device is fully described in corresponding implementing of the above-mentioned method, its description is omitted herein.

Since in the system, only the old bank note of bad image quality are processed for image restoration of interested region (ROI), while new bank note of good image quality are identified directly, a large amount of processing time for identification is saved and real-time responding speed is fast. Therefore, the system is suitable for applying to financial self-service equipment, provides low bank note refusal rate and good usability, and is good for the popularity of the financial self-service equipments.

Through the above description of the embodiment, those skilled in the art could clearly understand that the present invention could be implemented by means of software and necessary common hardware platform, or by means of hardware, although the former one is preferred embodiment under many circumstances. Based on such understanding, the technical solution of the present invention or the contributive part of the present invention over the prior art may be embodied in the form of software product, which could be stored in a storage media like ROM/RAM, disk, CD, etc and includes several instructions so as to instruct a computer device (which could be a personal computer, a server or a network equipment, etc.) to carry out the method described in each embodiment or some part of the embodiment of the present invention.

While preferred embodiments have been described above, it should be noted that for those skilled in the art, various changes and modification may be made thereto without departing from the principle of the invention, which also fall into the scope of the present invention.

The invention claimed is:

1. A method for identifying a valuable document, comprising:
    selecting a featured region of the valuable document and extracting features of the valuable document from the featured region;
    processing, based on the extracted features of the valuable document, the valuable document for fast classification according to a preset classification model, to pick out a bank note of good image quality and a bank note of bad image quality;
    processing an image of the bank note of bad image quality for image restoration, to obtain a restored image;
    identifying the bank note of good image quality directly and identifying the restored image, to determine the authenticity of the present bank note; and
    outputting the determination result of the present bank note;
    wherein the method further comprising a step of vectorizing the extracted features of the valuable document, which comprises: normalizing the image of the featured region of the valuable document to obtain a normalized image; selecting n different featured regions from the normalized image and calculating an average grey-scale value for each of the $1^{st}$ to $n^{th}$ featured regions; and
forming a featured vector according to the $1^{st}$ to $n^{th}$ average grey-scale values and,
    the classification model is built up based on a bank note type, a denomination, an orientation and image quality.

2. The method for identifying the valuable document according to claim 1, wherein the process of extracting the features of the valuable document comprises: selecting the featured region of multi-wavelength image of the bank note based on a multi-wavelength image characteristic of the bank note, a multi-resolution characteristic of the bank note image and an anti-counterfeit characteristic of the bank note image, and extracting the features from the selected featured region based on the classification model.

3. The method for identifying the valuable document according to claim 1, wherein the features of the valuable document comprises at least one of a white watermark, a black watermark, a variable ink, a magnetic security thread, a micro-printed word, a gravure printing pattern, a denomination number, and a bank note coding number.

4. The method for identifying the valuable document according to claim 1, further comprising presetting the classification model, which comprises:
    setting the featured regions based on p bank note types, q denominations for each bank note type, front and back sides for each denomination as well as image of new bank note and image of old bank note;
    normalizing formed p×q×4 different images to obtain normalized images;
    selecting n different featured regions from each of the normalized images, and calculating the average grey-scale values for the images of the $1^{st}$ to $n^{th}$ featured regions respectively, to form featured vectors; and
    training the featured vectors with R training samples to produce p×q×4 clustering centers, and thus building up the classification model for the featured region of the valuable document.

5. The method for identifying the valuable document according to claim 4, wherein the fast classification is performed according to a distance between the extracted feature of the valuable document and the clustering center of each category in the classification model.

6. The method for identifying the valuable document according to claim 5, wherein if the distance between the extracted feature of the valuable document and the clustering center of each category in the classification model is ranged in [0.1-0.5], the extracted feature belongs to this category, otherwise, the extracted feature does not belong to this category.

7. The method for identifying the valuable document according to claim 1, wherein in the process of processing the image of the bank note of bad image quality for image restoration, an object of the image restoration is an interested region (ROI) of the bank note of bad image quality.

8. The method for identifying the valuable document according to claim 1, wherein the image restoration is an image restoration technique based on partial differential equation.

9. A system for identifying a valuable document, comprising:
    a processor for implementing the following modules;
    an image collecting module, configured to collect image data of the valuable document;
    a memory module, configured to store the image data and necessary standard model data;
    a data processing module, configured to process the stored image data for feature extraction from a featured region, fast classification and image restoration, and pick out a bank note of good image quality and a bank note of bad image quality, wherein the fast classification is performed according to a preset classification model, and the classification model is built up based on a bank note type, a denomination, an orientation and image quality;
    an identifying module, configured to compare the processed image data with the standard model data to perform an identification process;
    an output module, configured to output the identified result of the identifying module; and a central control module, configured to control and harmonize data transmission between the modules;

wherein the system further comprising a step of vectorizing the extracted features of the valuable document, which comprises: normalizing the image of the featured region of the valuable document to obtain a normalized image;

selecting n different featured regions from the normalized image and calculating an average grey-scale value for each of the 1″ to n' featured regions; and forming a featured vector according to the 1″ to n' average grey-scale values.

10. A device for identifying a valuable document, comprising:

a processor for implementing the following modules;

a selecting module, configured to select a featured region of the valuable document;

an extracting module, configured to extract feature of the valuable document from the featured region;

a classification processing module, configured to process the input valuable document for fast classification according to a preset classification model based on the extracted feature of the valuable document, and pick out a bank note of good image quality and a bank note of bad image wherein the classification model is built up based on a bank note type, a denomination, an orientation and image quality;

a restoration processing module, configured to process an image of the bank note of bad image quality for restoration, to obtain a restored image;

an identifying module, configured to identify the bank note of good image quality obtained by the classification processing module directly; and identify the restored image obtained by the restoration processing module, to determine the authenticity of the a present bank note; and an output module, configured to output the determined result of the present bank note obtained by the identifying module;

wherein the device further comprising a step of vectorizing the extracted features of the valuable document, which comprises: normalizing the image of the featured region of the valuable document to obtain a normalized image; selecting n different featured regions from the normalized image and calculating an average grey-scale value for each of the 1″ to n' featured regions; and forming a featured vector according to the 1″ to n' average grey-scale values.

11. The method for identifying the valuable document according to claim 7, wherein the image restoration is an image restoration technique based on partial differential equation.

* * * * *